United States Patent [19]

John

[11] 3,901,215

[45] Aug. 26, 1975

[54] METHOD OF TESTING THE SENSES AND COGNITION OF SUBJECTS

[76] Inventor: Erwin Roy John, 3135 Netherland Ave., Riverdale, N.Y. 10463

[22] Filed: Oct. 3, 1973

[21] Appl. No.: 403,155

Related U.S. Application Data

[63] Continuation-in-part of Ser. No. 173,604, Aug. 20, 1971, Pat. No. 3,780,724, which is a continuation-in-part of Ser. No. 877,948, Nov. 19, 1969, abandoned.

[52] U.S. Cl. .............................................. 128/2.1 B
[51] Int. Cl. ........................................... A61b 5/04
[58] Field of Search .......... 128/2 R, 2 T, 2 Z, 2.1 B; 351/17, 30, 35, 36, 39; 179/1 N

[56] References Cited
UNITED STATES PATENTS 2,860,627  11/1958  Harden et al. .............. 128/2.1 B
3,032,029  5/1962  Cunningham ............... 128/2.1 B
3,498,287  3/1970  Ertl ................................. 128/2.1 B
3,574,450  4/1971  White et al. .................. 128/2.1 B
3,696,808  10/1972  Roy et al. ..................... 128/2.1 B

*Primary Examiner*—William E. Kamm
*Attorney, Agent, or Firm*—Eliot S. Gerber

[57] ABSTRACT

A patient who may be unable to cooperate is tested for auditory, visual and somatosensory perception and for various cognitive processes. The testing method involves selecting the conditions to be tested and, for each condition, establishing the patient's evoked response at a base line condition and his evoked response at a changed condition, the difference being automatically statistically analyzed. The method employs a system which includes an electroencephalograph, programmed stimulators, a $t$ test computer including an average response computer and a recorder.

8 Claims, 17 Drawing Figures

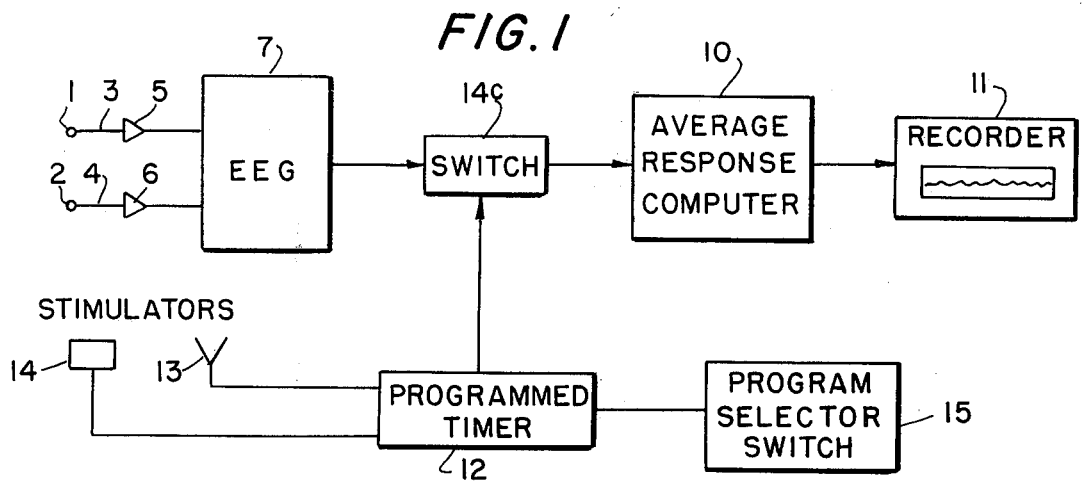
FIG. 1
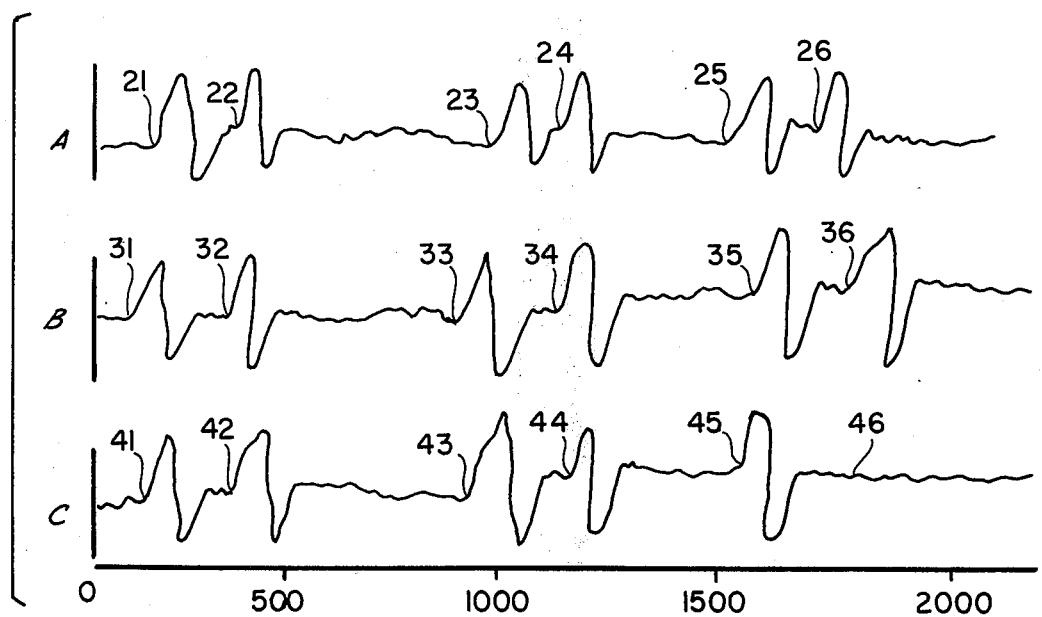
FIG. 2
FIG. 3

FIG. 15

| | CONDITION TO BE TESTED | A<br>BASE LINE | B<br>CONDITIONAL MEASURE |
|---|---|---|---|
| SENSORY EVALUATION | AUDIOMETRIC SCREENING | $A_1$<br>SILENCE | $B_1$<br>PURE TONE AT SPECIFIED INTENSITY |
| | VISUAL SCREENING | $A_2$<br>NO LIGHT OR<br>50% TRANSMISSION GRID<br>60 TO 80 LINES/INCH | $B_2$<br>FLASH OF LIGHT AT SPECIFIED INTENSITY OR<br>50% TRANSMISSION GRID<br>7-32 LINES/INCH |
| PERCEPTUAL EVALUATION | PITCH PERCEPTION | $A_3$<br>TONE 1 | $B_3$<br>TONE 2 |
| | SOUND PERCEPTION | $A_4$<br>PATTERN 1 | $B_4$<br>PATTERN 2 |
| | COLOR PERCEPTION | $A_5$<br>COLOR 1 | $B_5$<br>COLOR 2 |
| | SHAPE PERCEPTION | $A_6$<br>SHAPE 1 | $B_6$<br>SHAPE 2 |
| | PERCEPTION OF ORDER | $A_7$<br>REGULAR OR ORDERLY STIMULI (1st set) | $B_7$<br>REGULAR OR ORDERLY STIMULI (2nd set) |
| | PERCEPTION OF CHANGE | $A_8$<br>PERCEPTION OF ORDER TEST $(A_7 + B_7)$ | $B_8$<br>A DIFFERENT AND NEW STIMULUS |
| COGNITIVE EVALUATION | SHORT TERM MEMORY | $A_9$<br>PERCEPTION OF ORDER TEST $(A_7 + B_7)$ | $B_9$<br>USE $A_7$ |
| | RECALL (assimilation) | $A_{10}$<br>OCCURRENCE OF EXPECTED EVENTS | $B_{10}$<br>ABSENCE OF EXPECTED EVENTS |
| | RECOGNITION (expectancy) | $A_{11}$<br>ASSOCIATED EVENTS-regular in order | $B_{11}$<br>UNASSOCIATED EVENTS-random order |
| | CROSS MODALITY LEARNING | $A_{12}$<br>$\dfrac{B_2 + B_2 B_1}{B_1 + B_1 B_2}$ | $B_{12}$<br>$\dfrac{B_2}{B_1}$ |

METHOD OF TESTING THE SENSES AND COGNITION OF SUBJECTS

FIELD OF THE INVENTION

This is a continuation-in-part of application Ser. No. 173,604, filed Aug. 20, 1971 and entitled "Sensation-Cognition Computer," now U.S. Pat. No. 3,780,724, which was a continuation-in-part of application Ser. No. 877,948, filed Nov. 19, 1969, now abandoned, and entitled "Sensation-Cognition Computer."

The present invention relates to patient testing and more particularly to the testing of neural responses to auditory, visual or sensory stimuli, and to the perception of relationships between stimuli.

BACKGROUND OF THE INVENTION

Generally, the testing of auditory, visual or somatosensory systems requires the voluntary response of the patient. For example, eyes are examined by showing a chart having characters or pictures. The person being tested tells what he sees. Similarly, hearing is tested by presenting varying intensities and frequencies of sound. The person being tested tells when he can, and cannot, hear the sounds.

But, if the person being tested cannot or will not cooperate, the testing becomes difficult or impossible. For example, the person being tested may be an infant or a person unable to speak due to injury or other causes. Some subjects cannot, or will not, say if they can hear a noise, see a chart or light, or feel a sensory stimulation.

The present invention provides a method for testing whether hearing, vision or tactile sensation is impaired, and to determine the likelihood of mental retardation or minimum brain dysfunction. The prior art points out the existence of a widespread interest in the testing of children. For example, attempts have been made to test an infant's ability to fix his gaze on a light (stimulus) and to follow it with his eyes as it moved. Other tests for infants have involved observing them during the sounding of a buzzer or during their movement.

However, generally the disadvantage common to the methods employed in prior art studies was that the immature infant subject can do little, or nothing, to cooperate with the tester. The tester is therefore forced to cooperate with his subject. Further, the tester is forced to gauge the infant subject's response overtly, by what the infant does when exposed to the stimulus. Reliance upon the tester's observation and interpretation of the infant's overt acts introduces the possibility of human error.

The instant invention attempts to resolve the above-mentioned disadvantages inherent in the prior art testing methods. In the method of the invention herein disclosed, the tester does not have to rely on the test subject's overt responses to a stimulus. Thus, the element of human error inherent in the prior art methods is substantially reduced, if not totally eliminated.

SUMMARY OF THE INVENTION

The method of the invention contemplates presenting the test subject with a series of stimuli controlled by a programmed timer. The electrical responses of the brain to these stimuli are detected by electrodes attached to the appropriate regions of the head and amplified by an electroencephalograph (EEG). The average evoked responses to these stimuli are then extracted from the ongoing EEG activity by an average response computer (ARC). Signals extracted under different conditions are automatically compared, on a statistical basis, by a $t$ test computer. The signals, if deemed significantly different by that test, are then recorded and the percentage difference is calculated and also recorded.

Base assessment of a particular function is accomplished by presenting a series of stimuli with carefully specified parameters, in some sensory modality. After a stable baseline average response to such stimuli has been extracted, the parameter of interest is altered and a second average response is extracted. If these two average responses to the two sets of signals are significantly different by statistical criteria, the response of the brain was sensitive to the changed parameters of the stimuli. The presence of the evoked response itself provides an indication that the sensory stimulis effectively caused neural impulses from the peripheral sensory receptor (eye, ear, skin, etc.) to propagate through the central nervous system to the cortex. In addition, the detailed waveshape of the averaged evoked response may be presented to permit evaluation of whether the response process includes all of the electrophysiological features usually considered "normal." For example, absence of particular components in such waveshapes may indicate sensory malfunction.

The programmed testing methods of the present invention, while not all inclusive, answer three basic questions. First, can the brain of the subject under test sense the stimuli (sensory evaluation)? For example, this gives an estimate of how loud a sound must be for the subject to hear it or how big an object must be in order for the subject to see it. Second, is the brain of the subject able to discriminate between different sensory inputs (perceptual evaluation)? For example, this indicates whether he is able to recognize that different colors or shapes are different or that different tones differ from each other. Third, does experience modify or change the response of the subject's brain to the previous sensory inputs (cognitive evaluation)? For example, this tells whether the subject can recall or recognize the previous stimuli or has been able to assimilate the previous information.

All of the programmed testing follows the same basic procedure. After the function to be tested is chosen, an appropriate constant or base line condition is established. For example, if the evaluation is to be made of the subject's auditory function (hearing ability), the base line condition would be silence. This is the reference point from which his ability to hear is to be measured. At what intensity must sound be above the base line (silence) in order for the brain of the subject to respond to the stimulus? As another example, in order to measure the subject's perceptual ability as to pitch, one tone is considered as the base line and a determination is made at what frequency (or change of tone) above or below the base line a different response will be elicited in his brain.

After the constant or base line is established, the conditional measure (variable measure) is introduced. The conditional measure refers to that change of condition with which the subject will be tested. For example, referring again to the test of audio acuity where the base line is silence, a pure tone at a specific intensity is used as the condition measure. As another example, in order to measure the subject visual acuity, a spatial grid of lines so fine that it must be perceived as a grey blur is used to get the base line while grids with coarser lines are used as the condition measures.

Following the implementation of the base line and condition measure, the invention utilizes the $t$ test computer to determine, on a statistical basis and automatically, whether the brain of the subject responded to the difference between the base line and condition measure. If the $t$ test result shows that the brain "very likely", i.e., a selected degree of statistical confidence, responded differently to the two stimuli, then the recorder will record the presence of this positive response and the quantitative value of the difference.

The advantages of the method of the invention described herein are readily apparent. The early diagnosis of defective sensory, perceptual or cognitive functions affords one the opportunity for instituting early corrective measures, training or special care.

Other objectives of the present invention will be apparent from the following detailed description, describing the inventor's best mode of practicing the invention, taken in conjunction with the accompanying drawings. In the drawings:

FIGS. 1, 6 and 8 are block schematic diagrams of two embodiments of the testing instrument utilized in the methods of the present invention;

FIGS. 2, 3, 4 and 5 are graphs illustrating a normal brain wave response to a predicted stimulus and illustrating a normal brain wave response to an unpredicted stimulus;

FIG. 15 is a chart showing a series of programmed tests.

THE TESTING SYSTEMS

Figure 4:
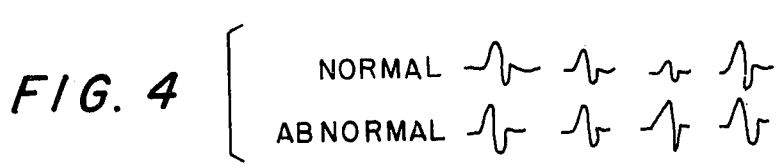

As shown in FIG. 1, the devices used are an electroencephalograph and programmed stimulators, switches, and an average response computer. Two contacts 1 and 2 are adapted for connection to the scalp of the person being tested. The leads 3 and 4 to the respective contacts 1 and 2 are connected to amplifiers 5 and 6, respectively. The amplifiers may be preamplifiers to the electroencephalograph 7. The electroencephalograph 7 is connected to a switch 14C which is connected to an average response computer 10 which, in turn, is connected to a pen recorder 11 or other indicating means. A suitable average response computer is described in Clynes U.S. Pat. No. 3,087,487. A simple stimulus is presented by the flashing light 13 or the click sounding device 14. Other stimulating devices are other sound producing devices and a device which produces a small shock or tap on the skin. The stimulating devices are controlled as to their sequence and timing by a program timer 12. Inputs to computer are switched at the proper time by switch 14 operated by timer 12. The timer 12 is controlled by a program. Preferably there are a plurality of alternative programs (some of which are described below) one of which is selected at a time by the program selector switch 15.

Figure 8:
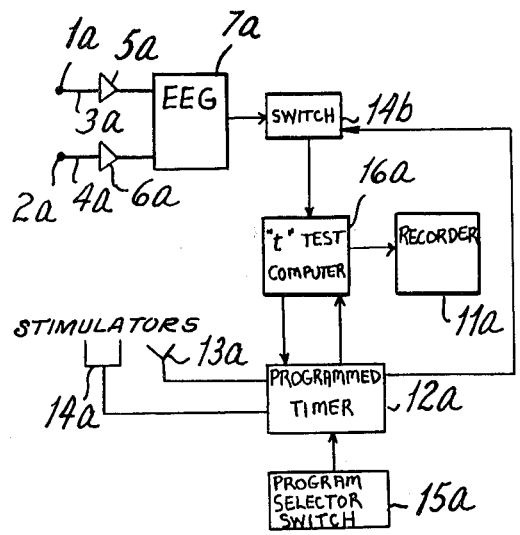

In the embodiment of FIG. 8 the devices used are an electroencephalograph, programmed stimulators, switches, a recorder and a $t$ test computer, part of which is an average response computer. Two contacts 1a and 2a, adapted for connection to the scalp of the person being tested, have leads 3a and 4a connected to preamplifiers 5a and 6a respectively. The preamplifiers 5a and 6a are connected to the electroencephalograph 7a which is connected to a switch 14b which in turn is connected to a $t$ test computer. The $t$ test computer 16a is connected to a pen recorder 11a or other indicating means. The stimulators 13a and 14a are controlled as to their sequence and timing by program timer 12a and the inputs to computer 16a are switched at the proper time by switch 14b operated by timer 12a. As in the other embodiments, the timer 12a is controlled by a program. Preferably there are available in timer 12a a plurality of alternative programs (some of which are described below) one of which is selected at a time by the program selector switch 15a. For example, the program may be in the form of punched holes on a paper or plastic tape, or may be electronic. The program performs the following functions: (1) it controls each of the stimulators 13a and 14a so that they operate in the selected sequence and time, (2) it controls the average response computer so that it records on the selected channel at the selected time period.

THE $t$ TEST COMPUTER

The $t$ test is a statistical test for a measure of the significance of the difference between two sample populations (conditions). For example, for a sample size of N = 10, corresponding to 10 sweeps (10 repetitions of each condition), to obtain a level of significance P of 0.001 (the result occurring by random chance 1 in 1000) the $t$ result must be 4.587. With 25 sweeps and $P = 0.001$ the $t$ result is 3.725.

Preferably both the number of sweeps N and the level of significance may be varied by dials on the $t$ test computer 16a to set a predetermined $t$ test standard. For example, the tester may set the maximum number of sweeps N at 25 and the level of significance P at 0.001. For each stimulus group, the $t$ test of the evoked response to the conditional measure ($X$ values) compared to the evoked response to the baseline ($Y$ values), will either exceed 3.725 (the predetermined $t$ standard) or be less than 3.725. If the $t$ test comparison of the two averages is larger than the criterion, then there is only 1 chance in 1000 that the result was by accident and consequently the test shows that the subject very probably responded differently to these stimuli. Upon such $t$ test result, the recorder 11a will record the presence of a positive response and the integrated amplitude of the difference stated as a percentage.

Preferably the $t$ test computer will send out its result to recorder 11a as soon as the predetermined $t$ test standard is reached, even though the standard is reached before the maximum set number of sweeps. For example, if N is set at 25 and the P set at 3.725 and the P value is exceeded on the 11th sweep, a control signal on line 15' will be sent and the remaining 14 sweeps omitted, since a satisfactory set of evoked responses has been obtained. Alternatively, at less cost, the $t$ test computer 16a may be set at the factory to perform a fixed number of sweeps P to assess a fixed value of $t$, thereby specifying the level of significance. In this alternative, at each stimulation a "go-no go" signal would be shown, for example, by the pen recorder or by a light.

Figure 9:
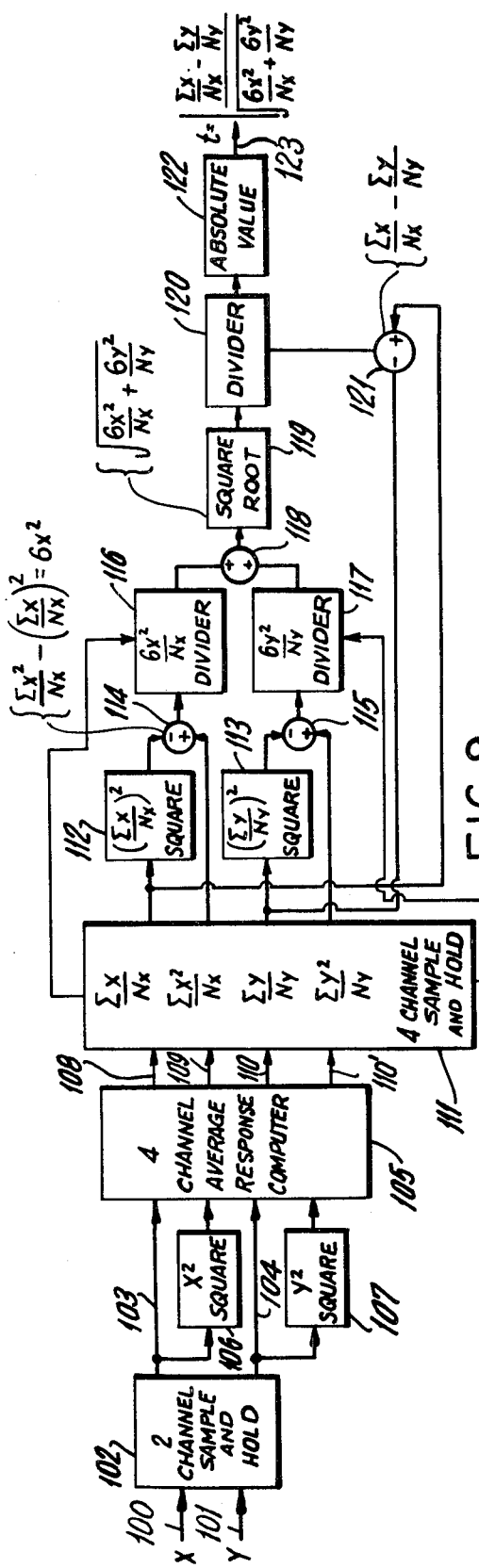
FIG. 9 is a block circuit diagram of the $t$ test computer.

The preferred embodiment of the $t$ test computer is shown in FIG. 9. As shown, the computer has two inputs — an X input on line 100 and a Y input on line 101. The inputs 100 and 101 are to a two-channel sample and hold circuit 102. The purpose of the sample and hold circuit 102 is to sample the two signals X and Y and to hold them so that they become in phase. circuit is shown in FIG. 1A. The output lines 103 and 104 of the sample and hold circuit 102 are each directly connected to one channel of a four-channel average response computer 105. In addition, the outputs 103 and 104 are connected to respective squaring circuits 106 and 107, the details of the squaring circuit being given in connection with FIG. 12. The average response computer 105 gives a value of samples taken periodically in time divided by the number of samples, thereby providing a running average, that is, an average which changes with the additional samples. A suitable average response computer is described in Clynes U.S. Pat. No. 3,087,487. The number of samples N is determined by the sampling rate which is set by the clock pulses produced by an internal clock, such as a crystal controlled oscillator whose output is divided, within the average response computer 105. The output of the first channel 108 is the average of the sum of the values of X, i.e., the sum of the voltages of each of the samples divided by the number of the samples N, which is the mean and may be expressed by the formula:

$$\frac{\Sigma X}{N_x} = M_1$$

The output of the channel 109 of the average response computer 105 is the sum of the X values squared over the number of samples and may be expressed by the formula: $(\Sigma X^2 / N_x)$ The output of channel 110 is the sum of the Y values over the number of samples and may be expressed by the formula:

$$\frac{\Sigma Y}{N_y} = M_2$$

and the output of channel 110' the sum of the Y values squared over the number of samples and may be expressed by the formula: $(\Sigma Y^2 / N_y)$.

Each of the channels is connected to a four-channel sample and hold circuit 111. The only purpose of the sample and hold circuit 111 is to permit the use of a single digitizer with the average response computer 105 and to sample the results. An alternative is to have a digitizer for each of the channels, in which case the sample and hold circuit 111 would not be necessary. The circuits of each of the four channels of the sample and hold circuit 111 are the same as the sample and hold circuit shown in FIG. 10A.

Figure 11:
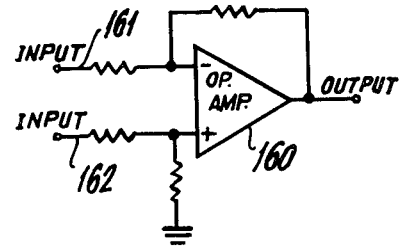
FIGS. 10A, 10B, 11A, 11B, 12, 13 and 14 are circuit diagrams of specific circuits used in the $t$ test computer of FIG. 9.

The output of channel 108, which is the mean, is then squared in a squaring circuit 112 and similarly the output of channel 110 is squared in a squaring circuit 113. Each of the squaring circuits is the same as shown in FIG. 10B. The output of the squaring circuit and the output of channel 109 are then combined in a differential amplifier 114. Similarly the outputs of the squaring circuit 113 and channel 110' are combined in differential amplifier 115. The detailed circuit of a suitable differential amplifier is shown in FIG. 11A. The formula for the computation which occurs in the differential amplifier 114 is:

$$\frac{\Sigma X^2}{N_x} - \left(\frac{\Sigma X}{N_x}\right)^2 = 6_x{}^2$$

and the formula for the mathematical computation which occurs in the differential amplifier 115 is $$\frac{\Sigma Y^2}{N_y} - \left(\frac{\Sigma Y}{N_y}\right)^2 = 6_y{}^2$$

Figure 11B:
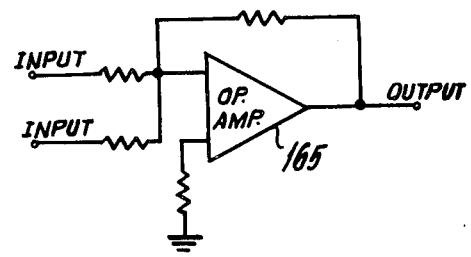
Figure 12:
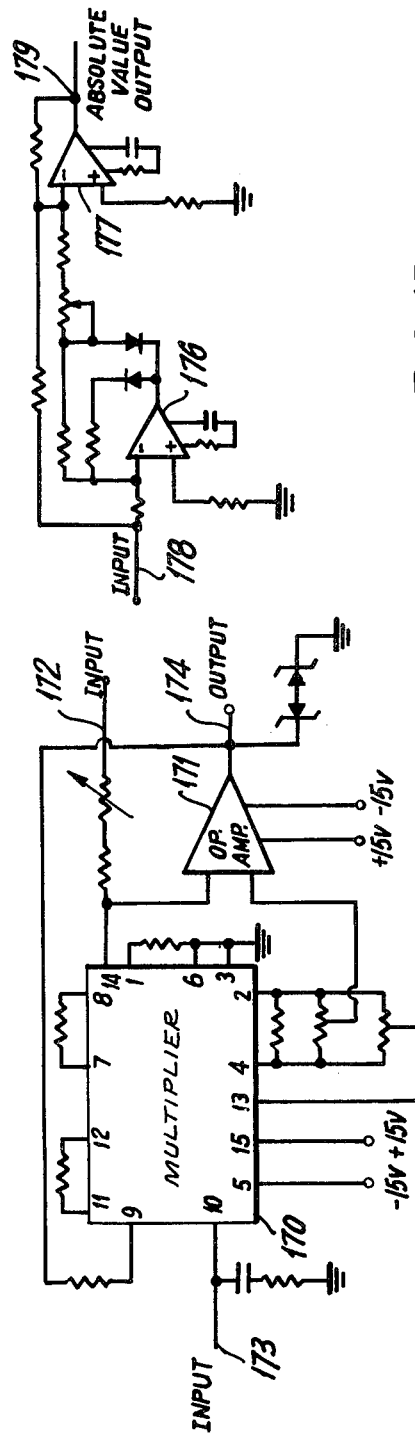

The outputs of the differential amplifiers are connected to the respective divide circuits 116 and 117, the details of which are shown in FIG. 12. The divide circuit 116 divides the deviation $6_x{}^2$ by the number of samples. The output of the divide circuits 116 and 117 are connected to summing amplifier (adder) 118 which performs the following mathematical computation:

$$\frac{6_x{}^2}{N_x} + \frac{6_y{}^2}{N_y}$$

a suitable circuit being shown in FIG. 11B. The output of the summing amplifier 118 is to a square root circuit 119, the details of which are given in FIG. 12. The output of the square root circuit is to the divide circuit 12 a suitable divide circuit being shown in FIG. 12. The second input to the divide circuit is from a differential amplifier 121 which may be of the type shown in FIG. 11A. The differential amplifier 121 provides the difference between the two means, that is, it accomplishes the mathematical computation as follows:

$$\frac{\Sigma X}{N_x} - \frac{\Sigma y}{N_y}$$

Figure 13:
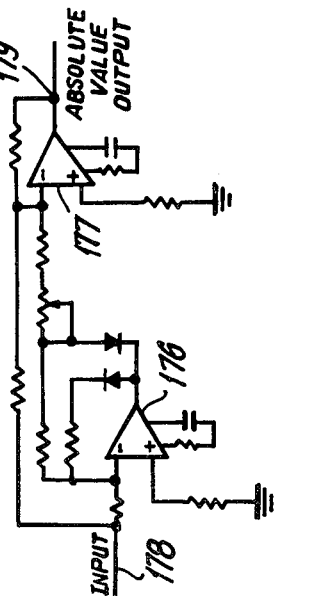

The output of the divide circuit 120 is to the absolute value circuit 121, shown in FIG. 13 which provides the final result of the $t$ test.

All of the computations necessary for the $t$ test have been provided by the circuit of FIG. 9 and the $t$ test result is taken at the output 123. The $t$ test computation performed by the circuit of FIG. 9 is as follows:

$$t = \left| \frac{\frac{\Sigma x}{Nx} - \frac{\Sigma y}{Ny}}{\sqrt{\frac{6x^2}{Nx} + \frac{6y^2}{Ny}}} \right|$$

A suitable squaring circuit, as shown in FIG. 10B, uses three integrated circuits. The integrated circuits 150 and 151 are operational amplifiers and may be of the type Motorola No. MC 1556-G. That integrated circuit is a compensated and monolithic operational amplifier. The integrated circuit 152 is a multiplier which, suitably, may be Motorola Type 1594-L. The multiplier, as its two inputs 153 and 154 derived from a common line 155 which is the output of the operational amplifier 150, and acts to square the input from line 155; that is, its inputs are tied together. A suitable integrated circuit is a monolithic four-quadrant multiplier where the output voltages are a linear product of two input voltages. The Motorola 1594–L is a variable transconductance multiplier with internal level shift circuitry and voltage regulation. The scale factor is adjustable and preferably is set to be 1/10 of input. An operational amplifier 15 is used to complete the multiplier connections from the integrated circuit 152. Its output 156 provides a square of the input at 157. This type of multiplier connection is described in further detail in the specification sheet dated Oct. 1970 DS–9163 from Motorola of Phoenix, Arizona, of their 1594– L integrated circuit.

Figure 10A:
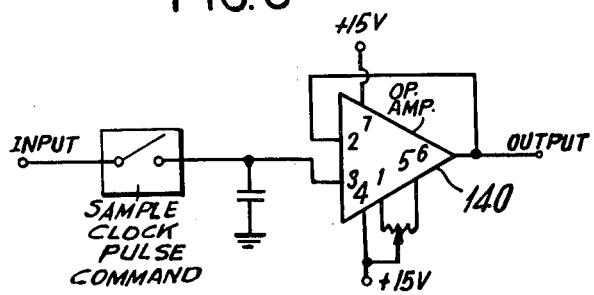
Figure 10B:
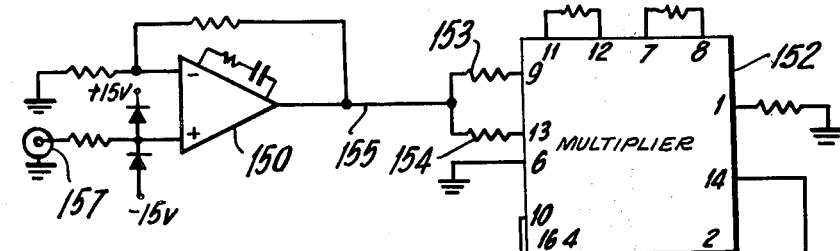

A suitable sample and hold circuit is shown in FIG. 10A. It uses an operational amplifier 140. Preferably operational amplifier 140 is an integrated circuit, for example, of the type Motorola No. 1456G, described above.

A suitable differential amplifier circuit is shown in FIG. 11A. It uses an operational amplifier 160 having two inputs 161 and 162. Preferably the operational amplifier 160 is an integrated circuit. A suitable integrated circuit is Motorola No. MC 1456G described in the specification sheet DS9147R1 dated April 1970 as being epitaxial passivated and monolithic. It has a power supply voltage of +18V dc and −18V dc, a power bandwidth of 40K Hz and power consumption of 45m W max.

The summing amplifier of FIG. 11B also uses an operational amplifier 165. The two inputs to be added are connected to one input of the amplifier 165. A suitable operational amplifier is the integrated circuit Motorola No. 1456G described above.

A suitable divider circuit is shown in FIG. 12. It uses a linear multiplier 170 and an operational amplifier 171. Preferably the multiplier 170 and the amplifier 171 are integrated circuits. A suitable integrated circuit for the multiplier 170 is Motorola No. 1594, described above, and for the amplifier Motorola No. 1456G, also described above. The inputs are 172 and 173 and the output at 174.

Figure 14:
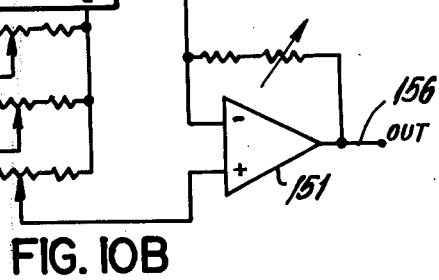

A suitable square root circuit is shown in FIG. 14. The square root circuit is a special case of a divider in which the two inputs to the multiplier are connected together. Consequently the input line 173 and the input line 172 are connected together to form a common input line 175.

A suitable absolute value circuit is shown in FIG. 13. It uses two operational amplifiers 176 and 177. Preferably they are integrated circuits and may be of the type Motorola No. 1456G described above. The input 178 is to the minus input of amplifier 176 and the output 179 is from amplifier 177. The purpose of the circuit of FIG. 13 is to provide a quantity regardless of the X or the Y terms are larger, the absolute value being the value regardless of the plus or minus sign of the quantity.

THE PROGRAMMED TESTING METHODS

Figure 6:
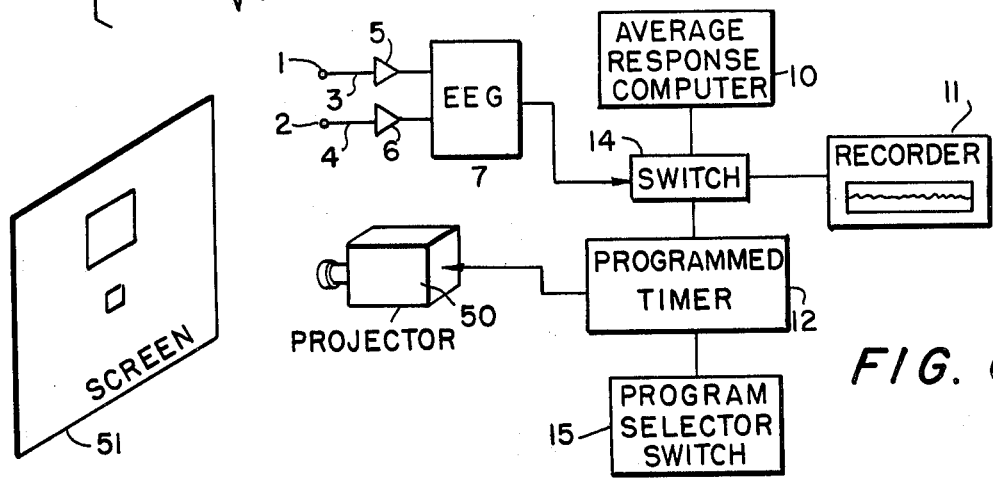

All programmed tests are summarized in FIG. 15. The first tests, preferably, are sensory evaluation, i.e., to test if the subject is capable of response to auditory and visual stimulation. For the auditory test the base line is silence and the conditional measure is a pure tone (preferably 250, 500, 1000 and 3000 Hz) at a selected intensity, preferably in accordance with audiometric standards (ISO–64). The averaged brain waves of the subject are measured and statistically compared for the time during the silence period and the pure tone period. If there is no statistically meaningful difference in brain wave searching for invariant features in the evoked response. For example, a large square figure is briefly shown on a screen to the subject, followed by a small square figure. The stimulator consists of a cathode ray tube or slide projector 50 which rapidly changes the slides being projected on screen 51, as shown in FIG. 6. That sequence of large square followed by small square is repeated, for example, for 30–100 times. The subject's brain wave response to these two stimuli is averaged in channels 1 (large) and 2 (small) in the average response computer 10 which reduces the adverse effects of noise. The results are recorded on recorder 11. Subsequently a large round figure is shown, followed by a small round figure. That pattern is rapidly repeated and the brainwaves averaged and recorded as before, with large circles in channel 3 and small circles in channel 4.

The recorded brainwaves from the two patterns are then compared. If the subject perceives squares and circles as different, two different waveshapes, corresponding to the two stimuli, will be recorded. That itself is a test of visual cognition. If the subject is of normal intelligence, for example, a young non-reading child of normal intelligence, then the recorded brainwave pattern for the first set (large and small square shapes) will differ from the recorded brainwave pattern for the second set (large and small round shape). Further, the normal person recognizes the similarity of shape (squareness vs. roundness) and tends to disregard the dissimilarity of size. His brain response, then the subject could not hear, for example, because of ear or brain damage. The subsequent hearing tests, involving pitch perception, sound perception, etc., need not be given to that subject.

Similarly, a vision screening test is given to test if the subject has at least 20/40 vision. The base line may be either no light or a 50% light transmission grid, the grid being 60–80 lines per inch. In a 50% transmission grid, the area of the open lines equals the area of the non-transmitting black lines. The conditional measure may be either a flash of light at a specified intensity or a 50% transmission grid at 7–32 lines per inch (changing the grid mesh) or changing the light and dark areas in the grid. If the subject's visual sense is not sufficient to provide a positive response to the test, the subsequent tests involving vision need not be given.

The next set of tests involves the subject's perceptual ability. His pitch perception is tested using a base line of one tone and a conditional measure of a different tone. His sound perception is tested using a base line of one sound pattern and conditional measure of a different sound pattern. His color perception is tested using a base line of one color and a conditional measure of one or a series of different colors — to test for color blindness.

Figure 7:
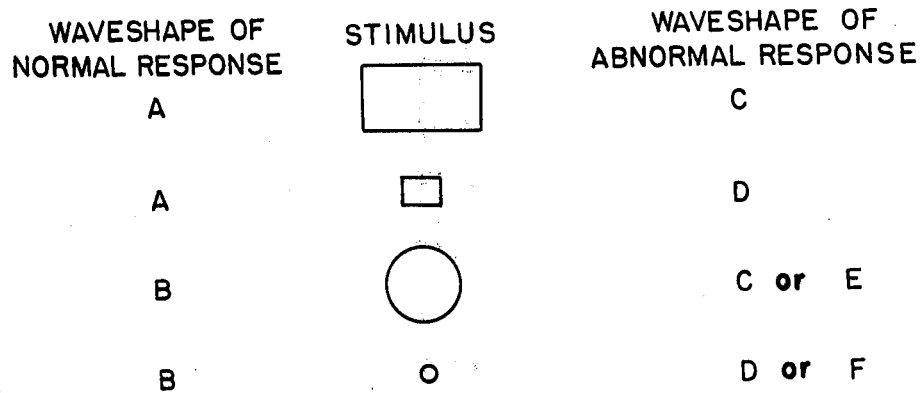
FIG. 7 is a chart showing a type of visual stimulus.

Testing the subject's shape perception involves the presentation of stimulus sequences which share a common pattern although varying in their specific stimulus composition, and waves correspond with that recognition. Therefore, channel 1 will resemble channel 2 and channel 3 will resemble channel 4. In contrast, a non-normal subject may perceive squares and circles as the same, or may fail to perceive large and small figures as similar, although their shape is the same (FIG. 7). The presentation of figures and the recording of the resulting brain wave is therefore a test of normal pattern perception and shape invariance. Such normal pattern response and shape invariance may be a prerequisite for reading or normal development. Its lack denotes that the subject may require special forms of training and care.

The subject's perception of order (habituation) is tested by a set of regular or orderly stimuli (for example, 25 clicks at 2.5 seconds apart - $A_7$), as the base line, followed by a set (150 additional clicks, without computation, and a set of 25 additional clicks ($A_8$) with computation.

As another example of perception of order (habituation) one presents stimulus in repeated blocks of 100 trials. For example, a 2 per second flickering light is presented for 50 seconds and the average response is computed in one channel of the ARC. After a 10-second pause, the 2 per second flicker is again presented for 50 seconds and an average response computed in the second channel of the ARC. After 10 seconds, another 100 flashes at 2 per second are averaged in the third channel. After 10 seconds a buzzer sounds and a 5 per second flicker is presented for 20 seconds and the response averaged in the fourth channel. The normal subject will show a progressive diminution to the repeated presentation of the same stimulus, due to habituation to a meaningless event. Thus the third average response will be smaller than the second, which will be smaller than the first. Presentation of the buzzer will cause dishabituation, and this will be further increased by the change in stimulus frequency, causing a marked increase in the size of the fourth average. In abnormal subjects, habituation will be slower or absent and dishabituation will not occur, as seen in FIG. 4. The percent of habituation is $$\frac{A_7 - A_8}{A_8}$$

and the $t$ test gives the significance of the difference between $A_7$ and $A_8$. The subject's perception of change (dishabituation) is tested by an order test as the base line and a different stimulus as the conditional measure, the test being of the subject's brain waves differ, in a statistically meaningful way, indicating that the subject responds differently to the two different sets of stimuli. For example, habituation occurs with 25 regular clicks ($A_8$), with computation, followed by 250 regular clicks, without computation. The new stimulus may be 25 unevenly timed clicks ($B_8$). The percent of dishabituation is $B_8 - A_8/B_8$.

The third group of tests is for an evaluation of the cognitive ability of the subject. His cognitive ability is tested by tests of recall (assimilation) and recognition and cross-modality learning. In the recall (assimilation) test the subject is first given a series of regular temporal patterns, for example, a series of three clicks at one per second with 5 seconds between triplets, the averaged brain wave response being $A_{10}$. As another example, the predictable pattern may be flashes F, as F—F, F—F, F—F, etc. Then the pattern is changed, for example, the second click of the triplet may be missing from random triplets on the next 100, the averaged brain wave response being $B_{10}$. In the second example, the absent but predicted event may be F—F, —F, F—F, F—, etc. The percent of assimilation is given by $A_{10}/B_{10}$.

If the subject is uncertain about stimuli, his brain waves will contain a large and late positive component, which is absent from his responses to stimuli about which he is certain.

In the recall test the base line is the occurrence of expected events and the conditional measure is the absence of expected events, as explained above.

The recognition (expectancy) test uses associated "certain" events as the base line and unassociated "uncertain" events as the conditional measure. The subject's evoked brain waves, if he is cognitive of the patterns, will contain a large late positive component by an "uncertain" event, particularly in the 100–300 milliseconds period after the stimulus, as shown in FIG. 2. In one suitable test the base is 50 regularly alternating clicks and flashes (one click or flash every 2 seconds, i.e., F,C, F,C, F,C, F,C, etc.) and the subject's averaged response computed as $A_{11}$. The conditional measures are fifty randomly mixed clicks and flashes (F,C,F,F,C,F,C,C,C,F,C,F,C,C,F,F,F, etc.) at the same rate, the subject's averaged response being $A_{12}$. The percent of recognition (expectancy) is $A_{12} - A_{11}/A_{12}$ and the $t$ test indicates if there is a significant statistical difference between $A_{11}$ and $A_{12}$ (see FIG. 15).

In the charts of FIG. 3, waveforms of different test patients are shown, the time is in milliseconds and the output in microvolts. These charts are an illustration of the recall (assimilation) method. In the waveform A, a flash and its evoked response occurs at points 21, 22, 23, 24, 25 and 26. This shows the normal response to the flash. Waveform B shows a flash and its evoked response at 31, 32, 33, 34 and 35. At 36 there is no flash, but the subject's short-term memory has the expectation of a flash and shows the same waveform as if the flash occurred. This is the normal response. In waveform C the flash and its evoked response are at points 41, 42, 33, 44 and 45. At point 46 no flash occurs and there is no response and no short-term memory. This is an abnormal response and indicates the absence of short-term memory. Such an absence may, for example, be associated with brain damage.

As another example of a suitable pattern using the recall (assimilation) method, a flash and a "click" sound may constitute a pair of stimuli. The pattern, with 5 seconds of rest between each pair, would be as follows: click-flash-(5 seconds rest); click-flash-(5 seconds rest); click. The brain wave would then be examined for the presence or absence of the expectancy of the omitted "flash" from the last pair of stimulii.

Figure 5:
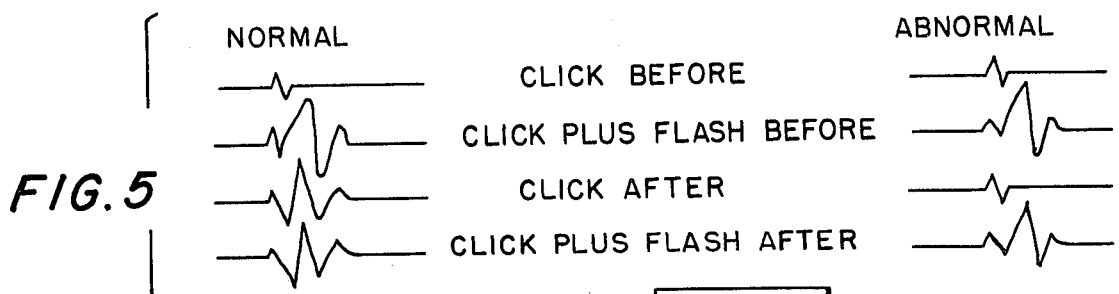

The cross-modality learning test uses transmission grids of light ($B_2$) and pure tones ($B_1$) according to the formula $B_2 + B_2 B_1 / B_1 + B_1 B_2$ as the base and according to the formula $B_2 / B_1$ as the conditional message. As another example of cross-modality learning (sensory-sensory conditioning) the response from the occipital area of the head, over the visual cortex, is utilized. The base line is the subject's click control averaged response, obtained in one channel of the ARC, while 50 clicks are presented at the rate of 1 per second. A second base line, to a click-flash averaged response, is then obtained in a second channel of the ARC, while 50 simultaneous click-flash paired stimuli are presented. A conditioning period then intervenes, during which 300 events occur. Each event consists of click alone, followed by, 250 milliseconds later, click plus flash. The interval between the click plus flash of each event and the click of the following event is 1 second. After the completion of the conditioning period, the conditional measure test period occurs. The conditional measure test period consists of 50 events each composed of click alone, followed 250 milliseconds later by click plus flash. By electronic switching, the response to click alone is averaged in a third channel of the ARC, while the response to click plus flash is averaged in the fourth channel. Comparison of channel one with channel 3 and of channel 2 with channel 4 reveals whether the conditioning procedure has altered the response of the visual cortex to the click. Changes will be observed in normal but not in abnormal subjects. The failure of abnormal subjects to show change may be due to a diffuse deficit in cognitive processes such as might occur in a mentally retarded child, or may be due to a specific deficit in associational mechanisms such as might occur in a child with an epileptic focus in the auditory cortex. By appropriate variation of the sensory modality of the first and second stimuli comprising the conditioned stimulus (FIRST) and unconditioned stimulus (SECOND) of a stimulus pair, it would be possible to discriminate between diffuse and specific deficits, accomplishing differential diagnosis. This method is illustrated in FIG. 5.

I claim:

1. The method of testing a subject's ability to respond to different sensory stimuli, comprising the steps of attaching electrodes to the subject's head, amplifying the subject's brain waves, providing a controlled timed sequence of external evoking stimuli to the subject, averaging the amplified brain waves over a number of said evoking stimuli, the said stimuli comprising a base set of evoking stimuli retaining, in a computer means, the averaged evoked brain waves in response thereto; providing a conditional set of evoking stimuli and retaining, in a computer means, the averaged evoked brain waves in response thereto; automatically computing whether there exists a statistically meaningful difference between the averaged evoked responses to the base and conditional measure set of stimuli, wherein the computational determination of the $t$ test, and displaying the results of said determination.

2. The method of testing of claim 1 to test a subject's audiometric ability wherein the base set is silence and the conditional set is a pure tone at a predetermined intensity.

3. The method of testing of claim 1 to test the subject's visual ability wherein the base set is a transmission grid at one grid spacing and the conditional set is a second transmission grid at a different grid spacing.

4. The method of evaluating a subject's perceptual ability comprising the steps of attaching electrodes to the subject's head, amplifying the subject's brain waves, providing a controlled timed sequence of external evoking stimuli to the subject, averaging the amplified brain waves over a number of said evoking stimuli, the said stimuli comprising base sets consisting of a repetition each of a first tone, a first sound pattern, a first color, and a first shape; retaining, in a computer means, the averaged evoked brain waves to said first sets of stimuli; providing a conditional set of stimuli consisting of a repetition each of a different tone, a different sound pattern, a different color and a different shape; retaining, in a computer means, the averaged evoked brain waves in response to said different stimuli; and automatically computing whether there exists a statistically meaningful difference between the averaged evoked responses to the base and conditional sets of stimuli and displaying the results of the determination.

5. The method of testing of claim 4 wherein the computational determination is the $t$ test.

6. The method of testing of claim 4 to test the subject's perception of order, wherein an additional base set is an ordered and repetitive set of stimuli in a first pattern and an additional conditional set is an ordered and repetitive set of stimuli in a second and different pattern, including the case in which the second set is randomly ordered.

7. The method of evaluating a subject's cognitive ability, comprising the steps of attaching electrodes to the subject's head, providing a controlled and timed sequence of external stimuli to the subject, amplifying the subject's brain waves, averaging the amplified brain waves over the number of said evoking stimuli, the said stimuli comprising a base set of stimuli which are associated events which are regular in order or relationship and retaining, in a computer means, the averaged evoked brain waves in response thereto; providing a first conditional set of evoking stimuli consisting of unassociated events which are random in order and retaining, in a computer means, the averaged evoked brain waves in response thereto; and automatically computing whether there exists a statistically meaningful difference between the averaged evoked responses to the base and conditional sets of stimuli to provide an indication of the subject's ability to assimilate, recall and recognize stimuli, wherein the computational determination is the $t$ test, and displaying the results of said computation.

8. The method of evaluating a subject's cognitive ability, comprising the steps of attaching electrodes to the subject's head, providing a controlled and timed sequence of external stimuli to the subject, amplifying the subject's brain waves, averaging the amplified brain waves over the number of said evoking stimuli, the said stimuli comprising a base set of stimuli which are associated events which are regular in order or relationship and retaining, in a computer means, the averaged evoked brain waves in response thereto; providing a first conditional set of evoking stimuli consisting of unassociated events which are random in order and retaining, in a computer means, the averaged evoked brain waves in response thereto; and automatically computing whether there exists a statistically meaningful difference between the averaged evoked responses to the base and conditional sets of stimuli to provide an indication of the subject's ability to assimilate, recall and recognize stimuli, and displaying the results of said computation, wherein to test the subject's cognitive ability of assimilation said base set of expected events is an ordered and repetitive set of stimuli and said conditional set to provide the absence of expected events is a similar set of stimuli but with certain of the stimuli of the first set ommitted.

* * * * *